United States Patent [19]

Dougherty et al.

[11] Patent Number: 4,994,091
[45] Date of Patent: Feb. 19, 1991

[54] CAMPFIRE PRODUCING ELEMENT

[76] Inventors: Gary J. Dougherty; Randall W. Seaman, both of P.O. Box 756, Deer Park, Wash. 99006

[21] Appl. No.: 461,303

[22] Filed: Jan. 5, 1990

[51] Int. Cl.$^5$ .............................................. C10L 11/06
[52] U.S. Cl. ...................................... 44/532; 44/541
[58] Field of Search ............................. 44/531–535, 44/541

[56] References Cited

U.S. PATENT DOCUMENTS

| | | | |
|---|---|---|---|
| 198,133 | 12/1877 | Matchett | 44/541 |
| 439,767 | 11/1890 | White | 44/533 |
| 739,131 | 9/1903 | Adler | 44/541 |
| 1,401,803 | 12/1921 | Lynes | 44/534 |
| 1,447,237 | 3/1923 | Coyne | 44/534 |
| 4,179,270 | 12/1979 | Clayton | 44/541 |
| 4,762,525 | 8/1988 | Wood | 44/534 |

FOREIGN PATENT DOCUMENTS 556791 5/1958 Canada ................................. 44/541

*Primary Examiner*—Carl F. Dees
*Attorney, Agent, or Firm*—Terry M. Gernstein

[57] ABSTRACT

A campfire producing element includes a hollow housing in which a plurality of layers of combustible material are located. The element has air flow conduits for adjusting the amount and rate of air flowing to the combustible material. A damper unit is associated with each air flow conduit for further adjusting the air flowing into the housing. An igniter unit includes a tubular conduit that extends into the housing and has a plurality of layers of combustible material.

10 Claims, 2 Drawing Sheets

CAMPFIRE PRODUCING ELEMENT

TECHNICAL FIELD OF THE INVENTION

The present invention relates to the general art of combustible materials, and to the particular field of artificial logs.

BACKGROUND OF THE INVENTION

Camping has become extremely popular in recent years, and more and more campers are including a campfire as part of their camping experience. These campfires are usually formed using kindling wood, sticks and logs that are available near the campsite or which have been brought along by the camper. The fire is started using matched, paper, flammable liquids or the like, and are quite pleasant once started.

However, there is often a problem with the fire wood in the area or that has been brought along for the purpose of forming a campfire. This problem often revolves around such wood being too damp to burn in a continuous and unattended manner. The campers must continually tend to the campfire to keep it burning, thus inhibiting the full enjoyment of the camping experience.

Still further, many campsites make use of local wood unlawful for campfires. If the camper has failed to bring firewood, he will not be able to have a campfire at all. This is an inconvenience at best, and a problem at worst if food must be cooked or warmth is required.

While the art has included several examples of artificial materials that can be used as kindling materials to get a campfire started, such materials are not designed for long periods of unattended burning. Thus, aids such as disclosed in U.S. Pat. No. 4,179,270, are intended to simply get another fire material burning and are thus intended for only short burning periods.

The art also includes artificial logs that are formed of pressed boards, chips and the like and are often used in a fireplace to give the visual effect of a fire. While these artificial logs are adequate for such aesthetic purposes, they often are not effective for use as a campfire material since they cannot be adequately controlled once ignited, and often do not give off heat in sufficient and controlled amounts for the purposes of a campfire. Still further, the ignition of these materials may prove cumbersome in a campfire environment.

Therefore, there is a need for an artificial log-type material that can be used in making a campfire, and can burn in a controlled and continuous manner without requiring constant attention, even in wet and damp conditions while still being easily transportable.

OBJECTS OF THE INVENTION

It is a main object of the present invention is to provide an artificial log-type material that can be used in making a campfire.

It is another object of the present invention to an artificial log-type material that can be used in making a campfire, and can burn in a controlled and continuous manner without requiring constant attention.

It is another object of the present invention to an artificial log-type material that can be used in making a campfire, and can burn in a controlled and continuous manner without requiring constant attention, even in wet and damp conditions.

It is another object of the present invention to an artificial log-type material that can be used in making a campfire, and can burn in a controlled and continuous manner without requiring constant attention, even in wet and damp conditions while still being easily transportable.

SUMMARY OF THE INVENTION

These, and other, objects are achieved by a combustible element that includes means for controlling air flow to and through the device. The element is formed of combustible materials such as cardboard, wood chips and remnants of artificial fireplace logs, and has several air conduits positioned therein with damper elements on these conduits. The dampers can be set before the element is ignited and will control the amount of air conducted into the interior of the element so that if the element is damp, more air can be used or the like. The element also includes an ignition assembly that makes igniting the element simple as compared to other elements presently available.

In this manner, the burning of element can be controlled and the rate of combustion of the element can be set according to dampness of the element as well as other considerations, such as how long the fire is to be maintained, how large the fire is to be, and the like. Once ignited, the element does not need further attention since combustion air is conducted into the interior of the element at a rate that is set to produce the desired result according to the existing conditions. The element is still light and easily transported.

BRIEF DESCRIPTION OF THE DRAWING FIGURES

DETAILED DESCRIPTION OF THE PREFERRED EMBODIMENT OF THE INVENTION

Figure 1:
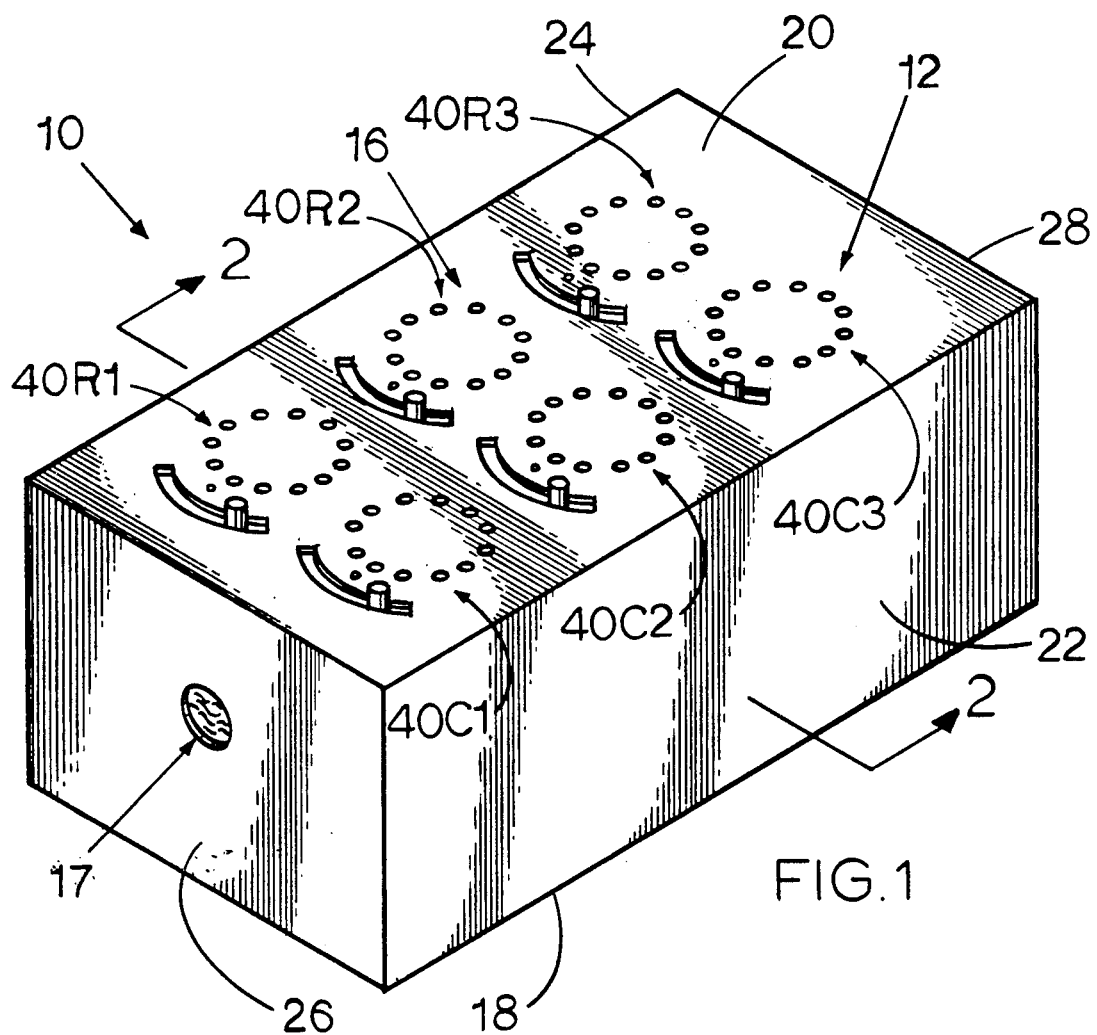
FIG. 1 is a perspective view of the campfire producing element of the present invention.
Figure 2:
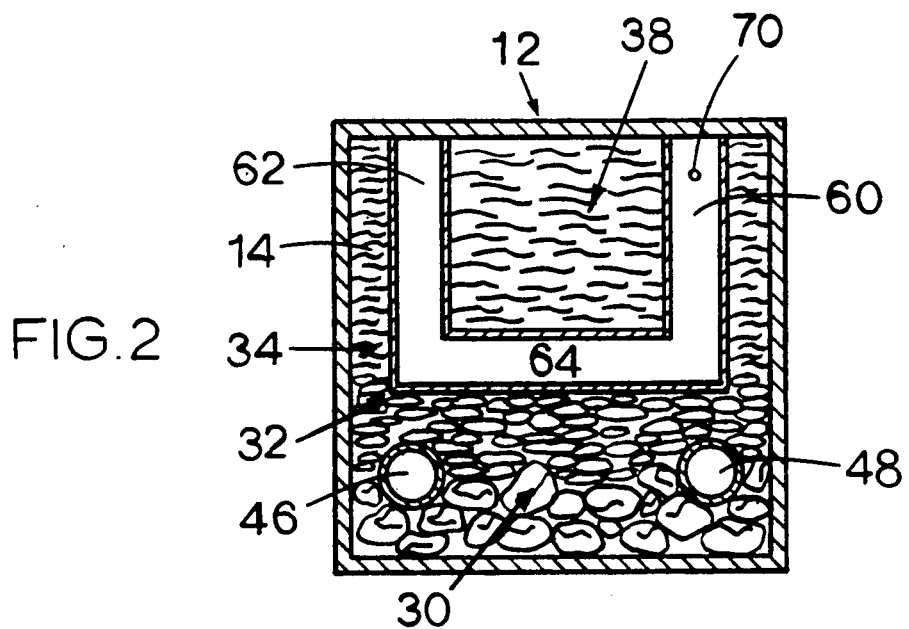
FIG. 2 is an elevational view taken along line 2-2 of FIG. 1.

Shown in FIGS. 1 and 2 is a campfire producing element 10 of the present invention. The element 10 is used in place of firewood and can be adjusted to burn at a desired rate according to the conditions existing at the time of the campfire. The element 10 is easily ignited and can burn in an unattended manner, yet will still produce a continuous and consistent flame.

By way of broad orientation, the element 10 includes a housing 12 that is hollow and formed of combustible material, such as cardboard or the like, and which contains a mixture of combustible materials !4 therein. An air flow system includes air inlet hole systems, such as system 16 and an ignition unit 17 is included on one end of the housing.

The housing 12 is polygonal and includes a bottom 18, a top 20, sides 22 and 24, and ends 26 and 28. The housing has a length dimension as measured between the ends 26 and 28, a width dimension as measured between the sides 22 and 24, and a thickness dimension as measured between the top 20 and the bottom 18. The dimensions are such that the element is easily stored and transported.

As is best shown in FIG. 2, the element 10 includes a plurality of layers of combustible materials. The material include a bottom layer 30 formed of pieces 32 of artificial logs. The artificial logs are presently available artificial logs formed of pressed wood parts, binders and the like. This layer 30 extends from the housing bottom 18 for just under one-half of the thickness dimension of the housing.

An intermediate layer 34 of combustible material extends from the top of the bottom layer to just over one-half of the thickness of the housing and includes wood chips, saw dust and the like. This layer can be tightly packed to the density commonly found in artificial logs and can include binders commonly found in such artificial logs.

A top layer 38 of combustible material includes shredded newspaper and extends from the top surface of the intermediate layer to the housing top 20. The packing of the top layer can be dense or loose depending on how quickly the element is intended to burn.

As discussed above, there are times when it is desired to burn the element faster than normal, and there are times when it may be difficult to get the element to burn at a normal rate. Accordingly, the element 10 includes an air flow system that feeds air directly to the interior of the housing and to the combustible material in the housing. In this manner, more air can be directed to the combustible material in the element in those instances when faster burning is desired.

The air flow system includes a plurality of air inlet hole systems 16 defined though the housing top 20 at spaced apart locations on that housing top. As shown in FIG. 1, the inlet hole systems are formed of a plurality of holes, such as hole 40, that are angularly spaced apart from each other along a perimeter of a circle. The circles have a specified diameter as will be discussed below, and the systems are divided into rows and columns to include systems 40R1–40R3 and 40C1–40C3.

Figure 3:
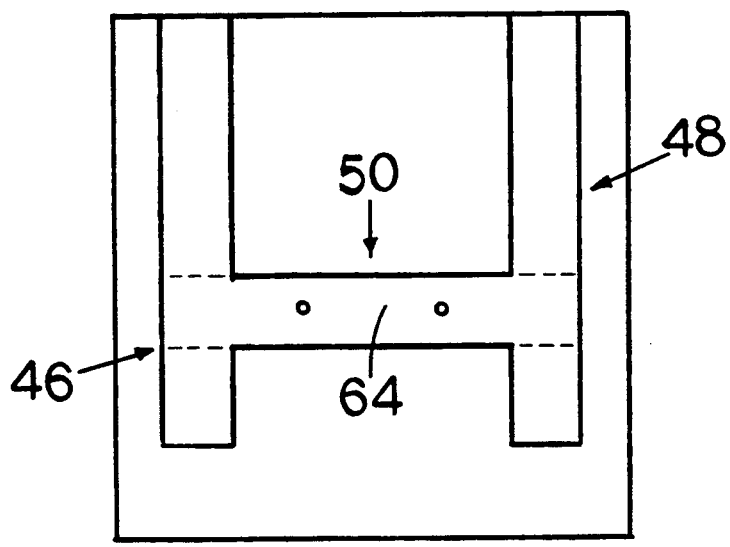
FIG. 3 is an end elevational view of the element showing the air conduits of the air flow system.
Figure 4:
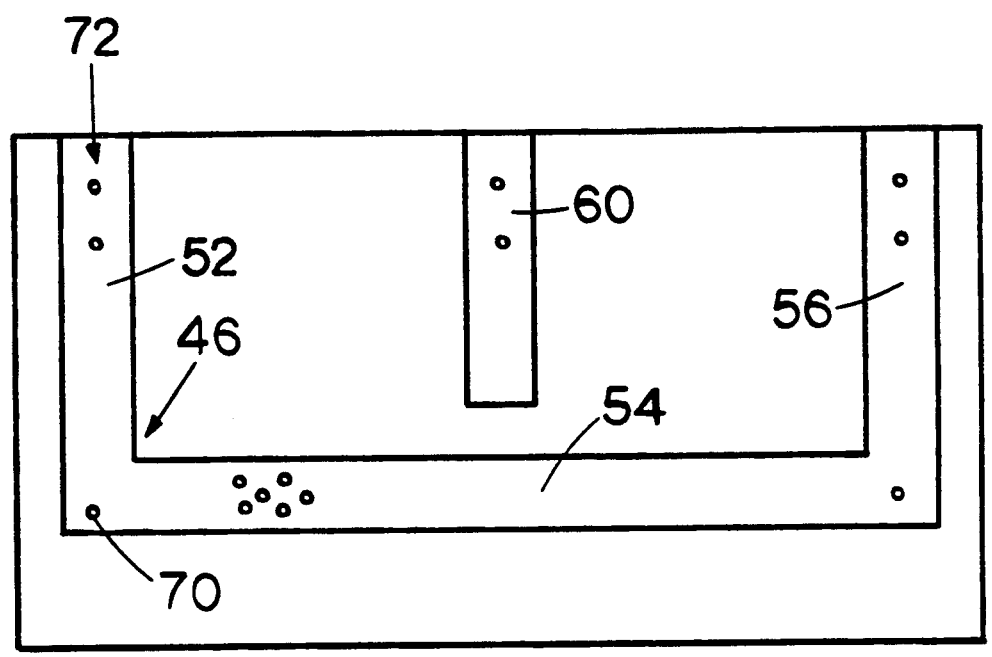
FIG. 4 is a side elevational view showing the air conduits of the air flow system.

As best shown in FIGS. 1, 3 and 4, the air flow system also includes a plurality of air flow conduits that fluidically connect the air inlet holes The air flow system includes two side air conduits 46 and 48 and a mid air conduit 50. Each of the side air conduits is U-shaped and includes an entrance section, such as entrance section 52 on conduit 46 having one end thereof connected to the housing top in surrounding relationship to the hole system 40C1 and extending downwardly from the housing top toward the housing bottom. Each of the side air conduits entrance sections extends for slightly more than one-half of the housing thickness dimension so that all of the layers of combustible material will be accessible to that air conduit. Each of these side air conduits also includes a horizontal section, such as horizontal section 54 in conduit 46 that extends along the length dimension of the housing for more than one-half that length dimension, and preferably for nearly the entire length dimension. A second entrance section, such as entrance section 56 on conduit 46, connects the horizontal section to a corresponding air hole system, such as system 40C3.

The mid air conduit 50 is U-shaped and includes two entrance air sections, such as entrance section 60 fluidically connected to hole system 40C2 and dependently mounted to the housing bottom to surround that air hole system, and entrance section 62 fluidically connected to hole system 40R2 and dependently mounted to the housing top to surround that hole system. The mid air conduit extends perpendicularly to the side air conduits The mid air conduit 50 also includes a horizontal section 64 connecting the two entrance air sections together. The entrance air sections are dimensioned to extend approximately one-half the thickness of the housing to locate the horizontal section 64 above the side air conduits.

The air conduits 46, 48 and 50 are all formed of combustible material, such as cardboard, and include a multiplicity of air holes, such as air holes 70 indicated on conduit 54. All of the air holes are not indicated on the figures for the sake of clarity. However, it is to be understood that each conduit includes air holes, such as air hole 70, located throughout its length.

The air flow system thus directs ambient air into the housing as indicated by arrow 72 in FIG. 4, and then into the combustible materials via the air holes 70. This aerates the combustible materials in a manner that is far more efficient than simply relying on normal air diffusion through such materials, and thus makes the element 10 burn efficiently.

The air flow system of element 10 further includes a damper system so that the amount of air ingested into the housing via the air conduits can be further adjusted according to the conditions existing at the time of burning For example, if the element is intended to last several hours, it may be desirable to decrease the amount of air flowing to the interior of the housing to slow the burning process; whereas if the combustion process is to be speeded up, the amount of air ingested to the housing may be increased.

Figure 5:
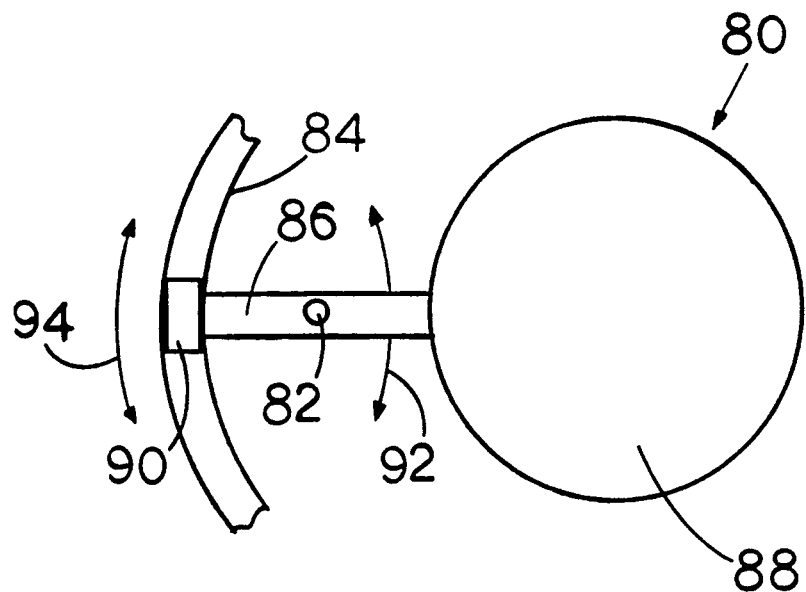
FIG. 5 is a top plan view of a valve element of the air flow control system.
Figure 6:
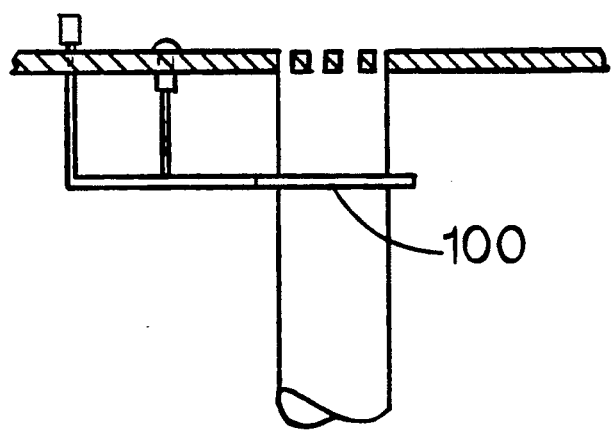
FIG. 6 is an elevational view of the valve element of the air flow control system.

To this end, the damper system is adjusted prior to igniting the element, and includes a plurality of damper units 80, one of which is shown in FIGS. 5 and 6. Each damper unit 80 includes a pivot pin 82 that is dependently affixed to the housing top and which extends inside the housing towards the housing bottom. Each pivot pin is located adjacent to one of the hole systems, and is located between such hole system and an arcuate slot 84 defined through the housing top. Each damper unit further includes a pivot arm 86 that has a butterfly type valve element 88 on one end thereof and a handle 90 on another end thereof. The pivot arm is mounted on the pivot pin for movement as indicated in FIG. 5 by the double-headed arrow 92 when the handle is moved in the arcuate slot 84 in the direction indicated by double-headed arrow 94.

Movement of the valve element 88 over the hole system prevents ambient air from flowing into the air conduit associated with that hole system and is effected by manually moving the handles 90 prior to igniting the element 10. Each air conduit includes a slot, indicated in FIG. 6 by slot 100, to accommodate the valve element 88 as that valve element partially or totally covers the air conduit to adjust the amount of air flowing into that conduit.

Figure 7:
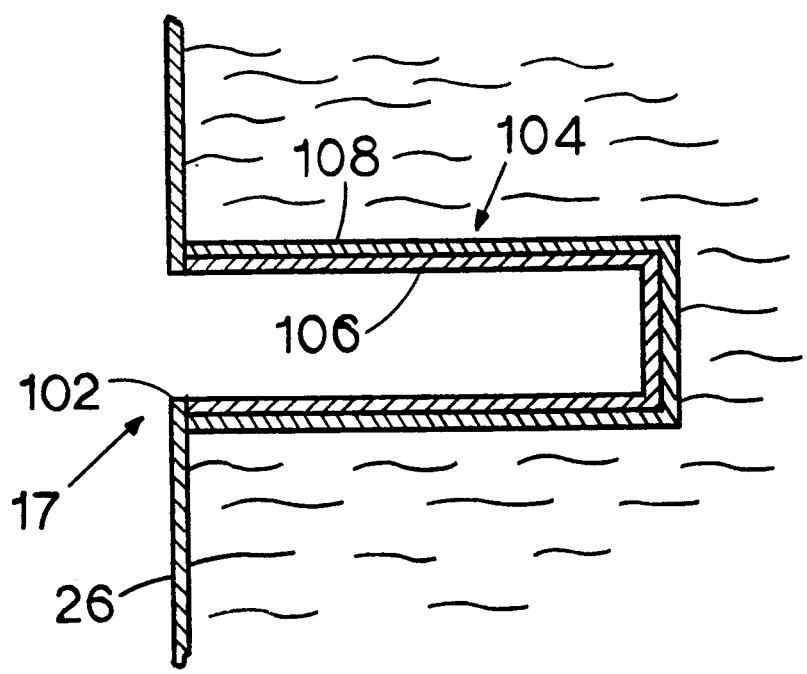
FIG. 7 is an elevational view showing the access opening of the ignition system.

The ignition unit 17 is used to ignite the element 10, and is shown in FIGS. 1 and 7. The ignition unit 17 includes an access hole 102 defined through housing end 26. A tubular conduit 104 is attached at one end thereof to the inner surface of the housing end and extends into the housing towards the other end 28. The conduit 104 is formed of easily ignited materials such as paper or the like, and includes a plurality of layers, such as first layer 106 and second layer 108. The first layer 106 forms the inside of the conduit and is selected to be easily ignited by a match or the like inserted into the conduit via the access hole. The second layer 108 is denser paper and can be treated so that it is ignited by the first layer and burns longer and hotter than the first layer. The second layer forms the outside of the conduit 104 and contacts the combustible material in the housing. The conduit 104 is located to contact the shredded newspaper layer as that layer is usually the easiest to light, and thus is located to be spaced less than one-half the thickness dimension from the housing top.

It is understood that while certain forms of the present invention have been illustrated and described herein, it is not to be limited to the specific forms or arrangements of parts described and shown.

We claim:

1. A campfire producing element comprising:
   (A) a hollow combustible housing having ends sides a top and a bottom, a length dimension as measured between said ends, a width dimension as measured between said sides and a thickness dimension as measured between said top and said bottom;
   (B) a plurality of layers of combustible materials in said housing which include
      (1) a bottom layer which includes artificial log type materials and which extends from said housing bottom towards said housing top for just under one-half the thickness dimension,
      (2) an intermediate layer which includes saw dust and which extends from said bottom layer towards said housing top, and
      (3) a top layer which includes shredded newspaper and which extends from said intermediate layer to said housing top and has a dimension as measured between said intermediate layer and said top of just under one-half the thickness dimension; and
   (C) an air flow system which includes
      (1) a plurality of air inlet hole systems defined through said housing top, each inlet hole system including a plurality of angularly spaced apart holes defined in a circular pattern,
      (2) two side air conduits each being U-shaped and each having two entrance sections each being in fluid communication with one of said hole systems and extending along said housing thickness dimension and having a horizontal section fluidically connecting said entrance sections together and extending along said housing length dimension,
      (3) a mid air conduit which is U-shaped and has two entrance sections each being in fluid communication with a hole system and extending along the thickness dimension of the housing toward the housing bottom, and a horizontal section which connects the mid air conduit entrance sections together and which extends along the housing width dimension,
      (4) each air conduit having a multiplicity of air perforations defined therethrough, and
      (5) plurality of a damper units mounted on said housing top and having one unit associated with each air flow conduit entrance section, each damper unit including
         (a) a pivot pin mounted on said housing top to depend into the housing interior,
         (b) an arcuate slot defined through said housing top and positioned so that said pivot pin is located between said arcuate slot and the hole system associated therewith
         (c) a pivot arm connected to said pivot pin,
         (d) a handle on one end of said pivot arm and extending through said slot,
         (e) a butterfly-type valve element mounted on another end of said pivot arm for movement therewith as said handle is moved in said slot, and
         (f) slot means defined through each air flow conduit entrance section to accommodate said butterfly valve-type element.

2. The campfire producing element defined in claim 1 wherein each air conduit entrance section extends for more than one-half of the housing thickness.

3. The campfire producing element defined in claim 2 further including an igniter unit on said housing.

4. The campfire producing element defined in claim 3 wherein said side air conduits extend for more than one-half the length of said housing.

5. The campfire producing element defined in claim 4 wherein said mid air conduit extends for more than one-half of the width of said housing.

6. The campfire producing element defined in claim 5 wherein each of said conduits is formed of combustible material.

7. The campfire producing element defined in claim 6 wherein said conduit combustible material is cardboard.

8. The campfire producing element defined in claim 7 wherein said igniter unit includes a tubular conduit having one end thereof attached to one side wall of said housing, and extending toward the other housing side wall, said tubular conduit including two layers of combustible material, and said igniter unit further includes an access hole defined through said housing one end with said tubular conduit surrounding said access hole.

9. The campfire producing element defined in claim 8 wherein each of said conduit entrance sections engages said housing top and surrounds an air hole system.

10. The campfire producing element defined in claim 9 wherein said mid aid conduit horizontal section extends perpendicularly to said side air conduit horizontal sections.

* * * * *